(12) United States Patent
Watanabe et al.

(10) Patent No.: US 7,864,908 B2
(45) Date of Patent: Jan. 4, 2011

(54) APPARATUS AND METHODS FOR CLOCK SIGNAL RECOVERY AND FOR JITTER MEASUREMENT RELATIVE TO THE RECOVERED CLOCK SIGNAL

(75) Inventors: Katsuhiro Watanabe, Funabashi (JP); Tetsuo Ogawa, Shizuoka (JP); Hiromi Nishizaka, Kanagawa (JP)

(73) Assignee: Tektronix, Inc., Beaverton, OR (US)

( * ) Notice: Subject to any disclaimer, the term of this patent is extended or adjusted under 35 U.S.C. 154(b) by 1173 days.

(21) Appl. No.: 10/804,671

(22) Filed: Mar. 18, 2004

(65) Prior Publication Data

US 2004/0223577 A1 Nov. 11, 2004

(30) Foreign Application Priority Data

Mar. 18, 2003 (JP) .............................. 2003-073316

(51) Int. Cl.
*H04L 7/00* (2006.01)
(52) U.S. Cl. ........................................ 375/371; 375/376
(58) Field of Classification Search .................. 375/226, 375/371, 376
See application file for complete search history.

(56) References Cited

U.S. PATENT DOCUMENTS

| | | | |
|---|---|---|---|
| 6,775,321 B1 * | 8/2004 | Soma et al. .................. | 375/226 |
| 6,832,172 B2 * | 12/2004 | Ward et al. ..................... | 702/69 |
| 6,934,648 B2 * | 8/2005 | Hanai et al. ................... | 702/69 |
| 7,206,340 B2 * | 4/2007 | Jungerman et al. .......... | 375/226 |
| 2004/0062301 A1 * | 4/2004 | Yamaguchi et al. ......... | 375/226 |
| 2004/0131113 A1 * | 7/2004 | Rao ........................... | 375/226 |

FOREIGN PATENT DOCUMENTS

JP 2000-198802 12/2000

* cited by examiner

*Primary Examiner*—Temesghen Ghebretinsae
(74) *Attorney, Agent, or Firm*—Kaname Kamibayashi; Francis I. Gray; Thomas F. Lenihan

(57) ABSTRACT

A recovered clock signal is simulated from an acquired external clock signal by use of an uncomplicated algorithm requiring few calculations. The recovered clock is usually used in an apparatus that receives external clock and external data signals and recovers the recovered clock signal from the external clock signal by use of a phase lock loop to process the external data according to the recovered clock. Apparatus according to the invention digitizes the external clock signal and stores resulting the time domain data in memories (step 48). It detects time domain data of edges of the stored external clock (step 50), and the detected time domain data of the edges are converted into frequency domain data (step 52). The frequency domain data are multiplied by the respective predetermined coefficients in different frequency domains (step 54). The resultant frequency domain data are restored to the time domain data (step 56) to obtain time domain data of the edges of the recovered clock signal. The recovered clock signal is used to measure jitter of the external clock and data signals relative to the recovered clock signal.

6 Claims, 4 Drawing Sheets

APPARATUS AND METHODS FOR CLOCK SIGNAL RECOVERY AND FOR JITTER MEASUREMENT RELATIVE TO THE RECOVERED CLOCK SIGNAL

CLAIM FOR PRIORITY

The subject patent application claims priority under 35 U.S.C. 119(a) from Japanese Patent Application serial number 2003-73316, entitled, METHODS FOR REGENERATING A CLOCK AND MEASURING JITTER, (Watanabe, et al.), filed 18 Mar. 2003 in the name of Tektronix Japan, Ltd.

FIELD OF THE INVENTION

The present invention generally relates to methods for recovering a clock signal from an external clock, and for measuring jitter in the external clock and in external data relative to the recovered clock, and specifically relates to methods for recovering a clock by software employing an uncomplicated algorithm requiring few calculations, and for measuring jitter in external clock and in external data signals relative to the recovered clock signal.

BACKGROUND OF THE INVENTION

As shown in FIG. 1, it has become usual that a Digital Video Signal Source 10, such as set-top box or personal computer, receives multimedia data via a communication line and provides processed digital video data (external data) and clock (external clock) to a Digital Video Monitor 12, such as a liquid crystal display (LCD), to display a video image. In such an arrangement, digital audio data is usually embedded in the digital video data. Monitor 12 has a Clock Recovery unit (CRU) 14 that receives the external clock signal from the Digital Video Signal Source 10 and recovers a clock for use by Monitor 12. The recovered clock signal is used for processing the video and audio signals in Monitor 12. Clock Recovery unit 14 may be a phase lock loop circuit (PLL) as shown in FIG. 2. Phase Lock Loop circuit 14 has a Phase Comparator 16, a Loop Filter 18 and a Voltage Controlled Oscillator (VCO) 20. Phase Comparator 16 compares the phases of the external clock from the Digital Video Signal Source 10 and the recovered clock. Loop Filter 18 receives the output signal of Phase Comparator 16 and controls the oscillation frequency of Voltage Controlled Oscillator 20. Therefore, Clock Recovery unit 14 generates the recovered clock signal exhibiting a phase synchronized with the external clock signal. Since Clock Recovery unit 14 includes Loop Filter 18, it considerably reduces jitter in the recovered clock signal even if the external clock signal exhibits jitter.

There are some measurements that indicate whether the interface between Digital Video Signal Source 10 and Digital Video Monitor 12 is good. One of these measurements is jitter of the clock and/or video data signals from Digital Video Signal Source 10 relative to the recovered clock signal generated in Clock Recovery unit 14.

For the measurement of the above jitter, the recovered clock signal may be acquired at the output of Clock Recovery unit 14. However, this measurement requires a technician to remove the cover of Monitor 12 and to use a probe, etc., which is a somewhat troublesome procedure risks damaging Monitor 12 because of the possibility of misconnection of the probe, or other such error. Besides, this procedure can measure only the interface characteristic of Digital Video Signal Source 10 relative to the individual Digital Video Monitor 12 being tested at the time.

Another method of jitter measurement is to provide another Clock Recovery unit in addition to the Clock Recovery unit already present in Monitor 12 to generate another recovered clock to measure the jitter in the external clock and in the external video data. However, even if the Clock Recovery unit is an IC, it is still hardware, so that there will be an individual difference depending on manufacturing lots, etc. Therefore, one cannot realize an additional hardware reference Clock Recovery unit without adding another cause of variation.

In view of the described individual differences in hardware clock recovery units, it is known to realize an ideal Clock Recovery unit by software. FIG. 3 shows an example of a system employing such a software clock recovery unit. Digital Video Signal Source 10 provides the external clock and digital video data (external data) to a Digital Storage Oscilloscope 22. FIG. 4 shows a schematic block diagram of Digital Storage Oscilloscope 22. Buffer circuits 24 and 26 receive the external clock and external data signals of Digital Video Signal Source 10 and analog-to-digital converters (ADCs) 28 and 30 digitize the outputs of Buffer Circuits 24 and 26, respectively. Fast Acquisition Memories 32 and 34 store the outputs of the ADCs 28 and 30. The Acquisition Memories 32 and 34 are coupled to a Bus 36. Processing Memory 38, Microprocessor 40, Program Memory 42, User Interface 44 and Display 46 are also coupled to the Bus 36. The external clock and external data stored in Acquisition Memories 32 and 34 are transferred to Processing Memory 38, and processed by Microprocessor 40 according to a program stored in the Program Memory 42, and then the result is displayed on the Display 46. User Interface 44 is used to set-up the operations of the input signal acquisition, data processing, etc.

The conventional Digital Storage Oscilloscope 22 stores software in its program memory 42 to simulate the operation of Clock Recovery unit 14, including a Phase Lock Loop circuit (PLL). Then, Microprocessor 40 processes the acquired external clock according to the PLL simulation software to generate a jitter-reduced clock that is equivalent to the recovered clock by adjusting the timing of the external clock. Microprocessor 40 compares the timing data of the recovered clock generated in the simulation and the timing data of the non-processed external clock acquired by the blocks 24, 28 and 32 according to the program stored in Program Memory 42 so that it measures the jitter of the external clock signal relative to the recovered clock signal. Similarly, Microprocessor 40 compares the timing data of the recovered clock signal generated in the simulation with the timing data of the non-processed external data signal acquired by the blocks 26, 30 and 34 according to the program stored in the Program Memory 42 so that it measures the jitter of the external data relative to the recovered clock. These measurement results are displayed on Display 46 as a histogram, a table, an eye pattern, etc.

Clock generation by the above software makes it possible to generate an ideal recovered clock independent of the hardware of the Clock Recovery unit. However, Acquisition Memories 32 and 34 store too many data samples to efficiently process in a reasonable time. That is, it takes a large amount of time to simulate operation of the phase lock loop over all the samples of the acquired external clock, which impedes quick measurement. Besides, known simulation software is large and difficult to use.

In the prior art, it has been described how to measure jitter of the clock and video data signals of a digital video source, such as set-top box or personal computer, relative to a recovered clock. Such an arrangement is also similar to that used to measure the jitter of data communication signals relative to the recovered clock.

U.S. Pat. No. 6,598,004 (Ishida et al.) corresponding to Japanese patent publication No. 2002-107392 discloses a jitter measurement method using a digital oscilloscope and an interpolation method that interpolates data around a zero-crossing from measured data of a signal under test to estimate timing of zero-crossings. Then, jitter is measured based on the estimated zero-crossings. Further, Japanese patent publication No. 2002-198802 discloses a jitter measurement of a phase lock loop using a digital oscilloscope as a jitter measurement apparatus. However, these references do not resolve the individual difference problem noted above.

Because of the described reasons, it is preferable to realize an ideal Clock Recovery unit by software employing an uncomplicated algorithm, and it would be better if the software requires few calculations. Further, it is preferable to measure the jitter of the external clock and the external data relative to the recovered clock recovered by the software.

Therefore, what is desired is to provide a clock recovery method that can simulate a recovered clock from an acquired external clock by an uncomplicated algorithm with few calculations. What is further desired is to provide a method for measuring jitter of an external clock relative to a recovered clock that is simulated from an acquired external clock by an uncomplicated algorithm with few calculations.

SUMMARY OF THE INVENTION

The present invention recognizes that a phase lock loop circuit of a Clock Recovery unit can be considered to be a filter. Then, it simulates the filter for the phase lock loop by software. Instead of precisely simulating the phase lock loop circuit so that the algorithm can be uncomplicated. The subject method recognizes that the jitter measurement requires focusing only on clock edge(s) (leading edge and/or trailing edge) so that it detects or picks out and filters only the edges of the acquired external clock. This recognition considerably reduces the amount of data to simulate.

Therefore, the present invention provides a method for simulating an ideal recovered clock of an apparatus (12) that receives external clock and external data, and recovers the recovered clock from the external clock by a phase lock loop circuit (14) in order to process the external data according to the recovered clock. The external clock is digitized to store the time domain data of the external clock in memories (32, 38) (step 48). The time domain data of edges in the stored external clock are detected (step 50). The detected time domain data of the edges of the external clock are converted into frequency domain data (step 52). The frequency domain data are multiplied by the respective predetermined coefficients in difference frequency domains (step 54). The resultant frequency domain data are restored to time domain data (step 56) to obtain the time domain data of the edges of the recovered clock to generate the recovered clock (step 58).

The present invention also provides a method for measuring jitter of an external clock relative to a recovered clock in an apparatus that receives external clock and external data, and recovers the recovered clock by a phase lock loop circuit (14) in order to process the external data according to the recovered clock. The external clock is digitized to store the time domain data of the external clock in memories (32 38) (step 48). Time domain data of edges of the stored external clock (step 50) are detected. The detected time domain data of the edges of external clock are converted into frequency domain data (step 52). The frequency domain data are multiplied by the respective predetermined coefficients in different frequency domains (step 54). The resultant frequency domain data are restored to time domain data (step 56) to obtain time the domain data of the edges of the recovered clock (step 58). The obtained time domain data of the edges of the recovered clock are compared with the time domain data of the edges of the stored external clock (step 60) to measure the jitters of the external clock relative to the recovered clock (step 62).

Further, the present invention provides a method for measuring jitter of an external data relative to a recovered clock in an apparatus that receives an external clock and the external data, and recovers the recovered clock by a phase lock loop circuit (14) in order to process the external data according to the recovered clock. The external clock and external data are digitized and stored in memories (32 34 38) (step 48). Time domain data of edges of the stored external clock are detected (step 50). The detected time domain data of the edges of the external clock are converted into frequency domain data (step 52). The frequency domain data are multiplied by the respective predetermined coefficients in difference frequency domains (step 54). The resultant frequency domain data are restored to time domain data (step 56) to obtain time domain data of the edges of the recovered clock. The obtained time domain data of the edges of the recovered clock are compared with the time domain data of the stored external data to measure the jitters of the external data relative to the recovered clock.

The objects, advantages and other novel features of the present invention are apparent from the following detailed description when read in conjunction with the appended claims and attached drawings.

DETAILED DESCRIPTION OF PREFERRED EMBODIMENTS THE INVENTION

Figure 1:
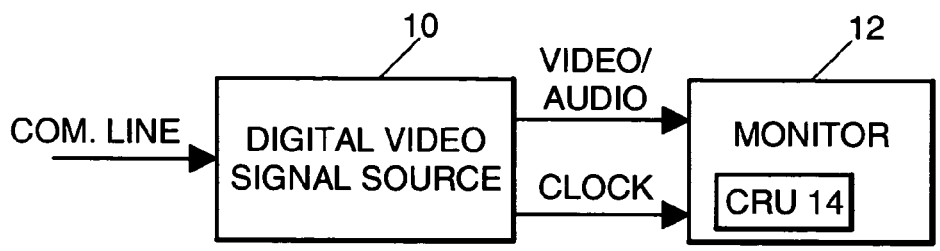
FIG. 1 is a block diagram showing a relationship between a Digital Video Signal Source and Digital Video Monitor.
Figure 2:
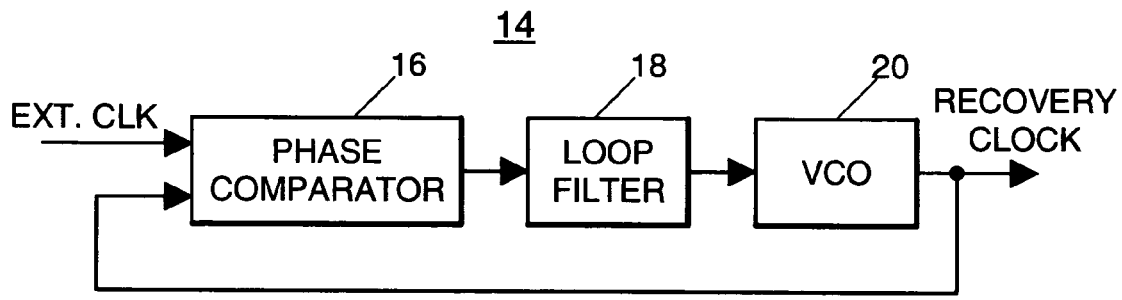
FIG. 2 shows a schematic block diagram of hardware of a Clock Recovery unit in a Digital Video Monitor.
Figure 3:
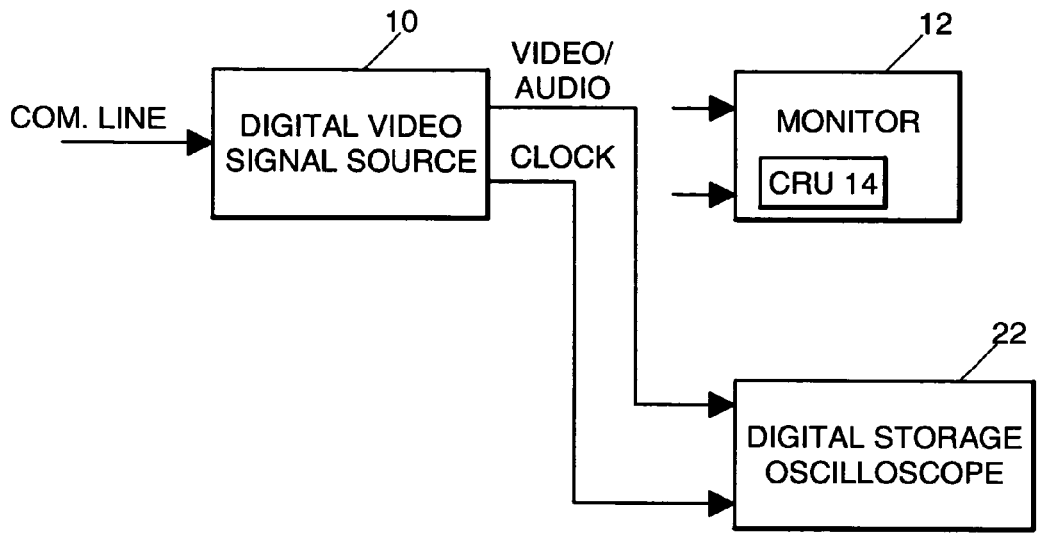
FIG. 3 shows a schematic block diagram using a Digital Storage Oscilloscope for measuring jitter of external clock and external data from a Digital Video Signal Source relative to a recovered clock.
Figure 4:
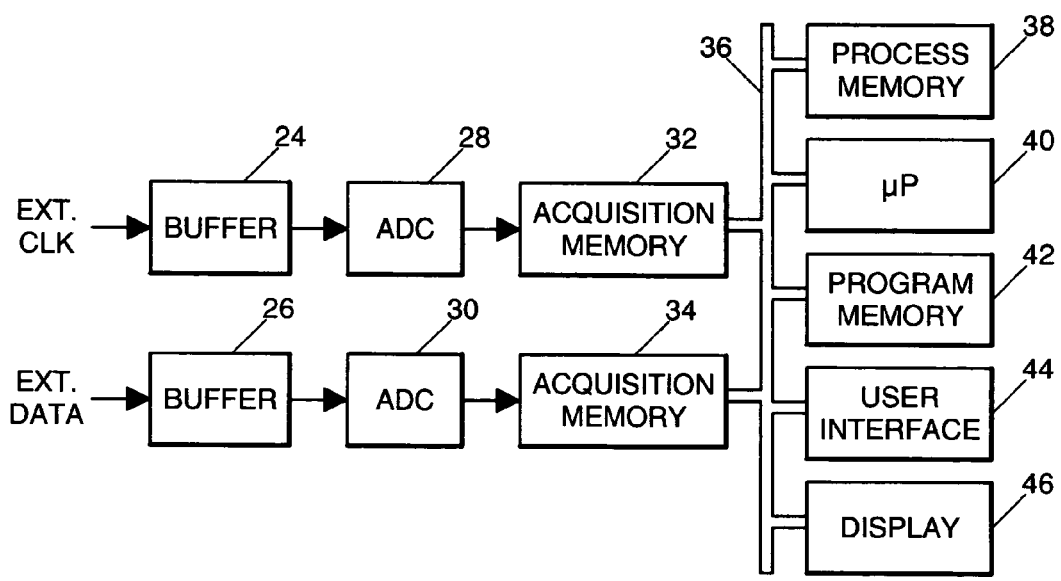
FIG. 4 shows a schematic block diagram of a Digital Storage Oscilloscope suitable for use with the invention.
Figure 5:
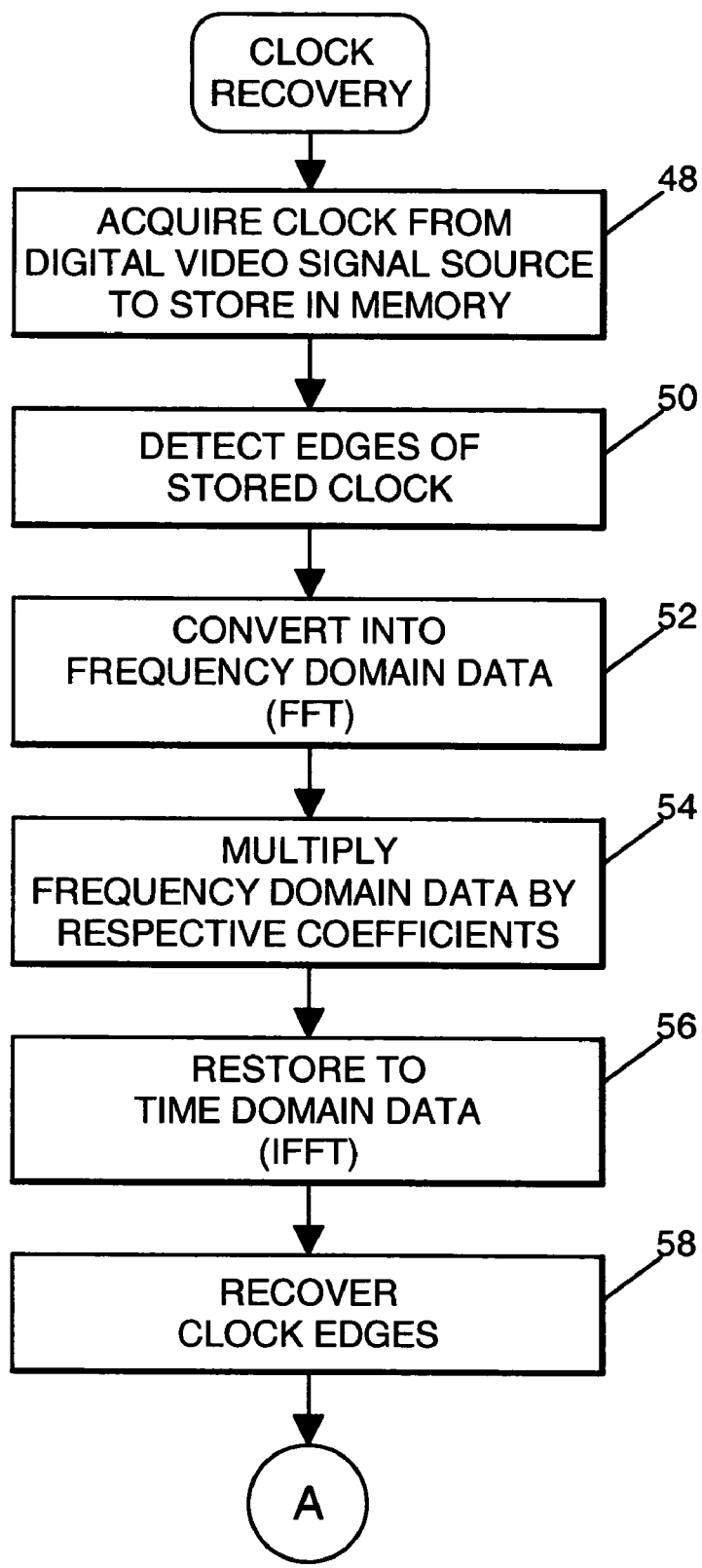
FIG. 5 shows a flowchart for recovering a clock according to the present invention.

In the following discussion of the FIGURES, elements in different FIGURES having similar functions are assigned the same reference numbers. As shown in FIGS. 3 and 4, a preferred embodiment of the present invention uses a Digital Storage Oscilloscope 22. A buffer 24 receives an external clock from a Digital Video Signal Source 10, and a buffer 26 receives digital video data (external data) from Digital Video Signal Source 10. Program Memory 42 stores software as shown in a flowchart of FIG. 5, and a Microprocessor 40 controls Digital Storage Oscilloscope 22 according to this flowchart. Reference will now be made to FIGS. 3, 4, and 5. In step 48, an ADC (analog to digital converter) 28 digitizes the external clock to store it in an Acquisition Memory 32. An ADC 30 also digitizes the external data to store it in an Acquisition Memory 34. These time domain data (time functional data) of the external clock and external data stored in the memories 32 and 34 are transferred to a Processing Memory 38. In step 50, Microprocessor 40 detects the edges of the external clock signal stored in Processing Memory 38. Specifically, Microprocessor 40 detects the edges by comparing a sample of the acquired external clock with the former and later samples that are sequentially sampled by the ADCs to detect the points in time at which the level of the external clock changed between high and low levels. Microprocessor 40 may detect both leading and trailing edges, or only one of the leading and trailing edges, according to the measurement necessity. If there is no intermediate sample between the high and low levels, interpolation may be performed to obtain more accurate edges.

As described, only the edge data of the acquired external clock are detected. In this way not all of data needs to be processed which considerably reduces the calculations that otherwise would be required. In step 52, the detected edge data (time domain data) is converted into frequency domain data (frequency functional data) by fast Fourier transform (FFT), etc. As described, the phase lock loop circuit can be seen as just a filter for the jitter measurement. In step 54, the detected frequency domain data of the edges are multiplied by the respective coefficients of the corresponding frequency domains (frequency bands) for equivalently filtering the edges of the external clock. The respective coefficients are selected to achieve a filter function of the ideal Clock Recovery unit 14. In step 56, the calculated frequency domain data is restored to the original time domain data by use of an Inverse Fast Fourier Transform (IFFT), for example. In steps 52, 54 and 56, not all samples but only the edges of the external clock are processed so that the processing time is considerably reduced. One skilled in the art will realize that step 54 is a simple multiplication process that tends to reduce the overall complexity of the algorithm. Finally, a recovered clock is restored, resulting in a simulation of the acquired external clock, as shown in step 58. Processing Memory 38 stores the data of the recovered clock.

Figure 6:
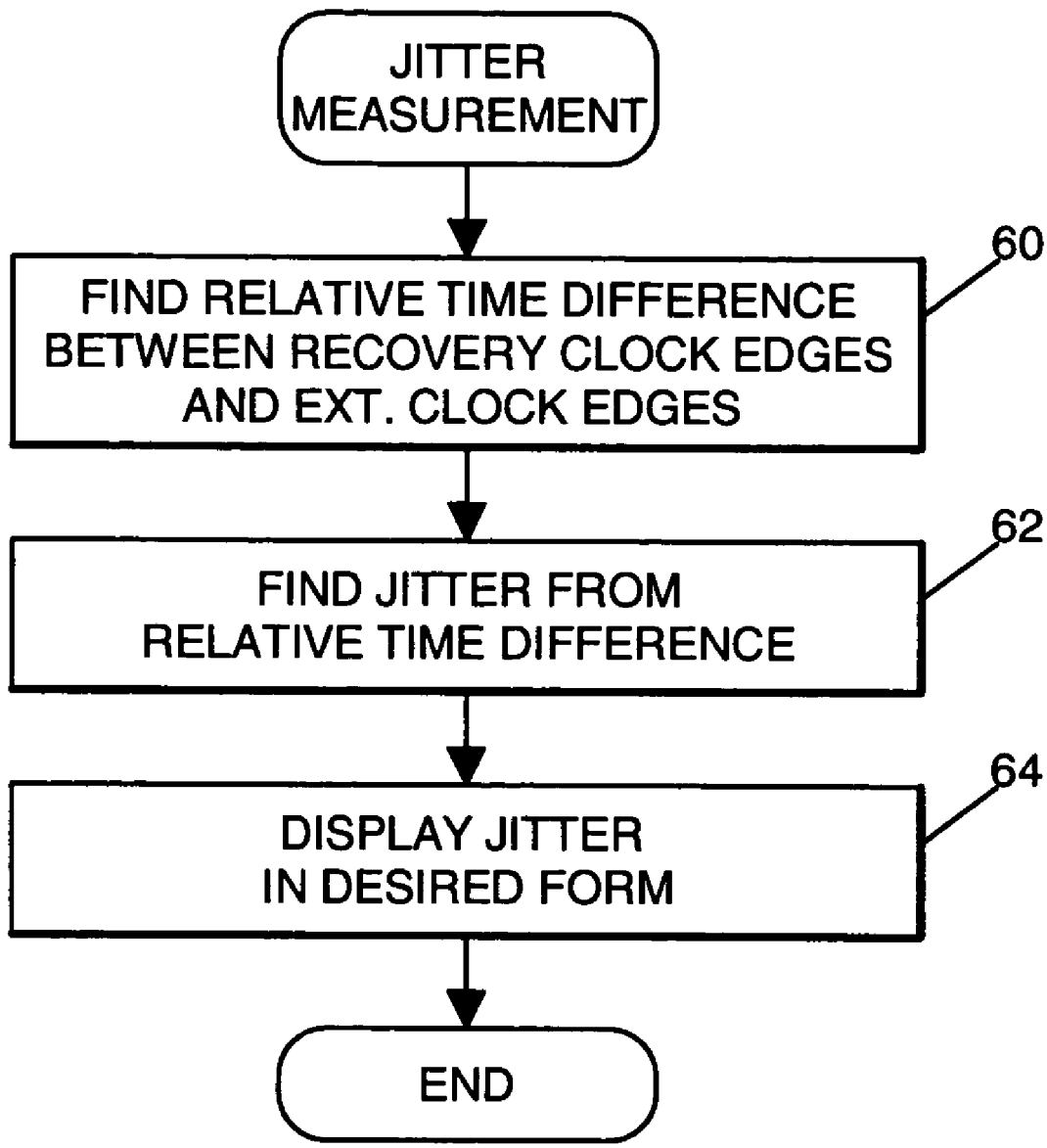
FIG. 6 shows a flowchart for measuring jitter according to the present invention.

After the step 58, the recovered clock is used for a jitter measurement as shown in FIG. 6 via a connection-step A. Program Memory 42 stores software realizing the flowchart shown in FIG. 6, and Microprocessor 40 conducts the jitter measurement according the software.

In step 60, Microprocessor 40 measures the jitter of the external clock relative to the recovered clock, and obtains relative time differences between the edges of the recovered clock stored in Processing Memory 38 and the respective edges of the external clock. Variations of the relative time differences of the respective edges are jitter. Thus, the jitter of the respective edges is calculated from the relative time differences in step 62. The jitter can be displayed in the form of a histogram, a table, an eye pattern, etc. Microprocessor 40 controls Display 46 to display jitter in a user-desired form that is set via User Interface 44 by a user.

Jitter measurement of the external data relative to the recovered clock is similar to the flowchart in FIG. 6. In step 60, the edges of the external data are used instead of the external clock edges to conduct the jitter measurement in a similar manner. Similarly, measurement results are also displayed in a user-desired form such as a histogram, a table, an eye pattern, etc.

Preferred embodiments of the present invention have been described above, those skilled in the art will recognize there are many variations that can be made without departing from the principles of the invention. For example, the measurement objects in the above embodiments are the external clock and digital video data signals from a Digital Video Signal Source, but various digital data and clock signals transmitted via a communications line can also be the objects of such jitter measurement.

In this examples described above, the coefficients in the step 54 are selected to simulate a filter function of an ideal Clock Recovery unit in a receiver. Alternatively, the coefficients in the step 54 may be modified to simulate a Clock Recovery unit that has a characteristic which is out-of-the-ideal (i.e., non-ideal). Furthermore, the acquired external clock and external data signals may be transferred to a personal computer to conduct the process of the present invention instead of conducting all of the process in a Digital Storage Oscilloscope.

As described above, the present invention can simulate a recovered clock from an acquired external clock by use of an uncomplicated algorithm requiring few calculations. Moreover, an embodiment of the invention can measure jitter of external clock and external data relative to this recovered clock by simulating the recovered clock from the acquired external clock by use of an uncomplicated algorithm requiring few calculations. In addition, proper setting of coefficients in multiplication steps enables simulation of either an ideal phase lock loop circuit or a phase lock loop circuit exhibiting another desired characteristic.

What is claimed is:

1. A method for simulating operation of a phase lock loop circuit in an apparatus that receives external clock and external data signals for recovering a recovered clock from said external clock signal by use of said phase lock loop circuit, comprising the steps of:

digitizing said external clock signal to obtain time domain data and storing said time domain data in a memory;

detecting time domain data of edges of said external clock signal;

converting said detected time domain data of said edges of said external clock into frequency domain data;

filtering said frequency domain data by multiplying said frequency domain data by respective predetermined coefficients in different frequency domains; and restoring the resultant frequency domain data to time domain data to obtain time domain data of edges of said recovered clock.

2. The method as recited in claim 1 wherein the coefficients are selected to simulate a filter corresponding to said phase lock loop circuit.

3. A method for measuring jitter of an external clock signal relative to a recovered clock signal in an apparatus that receives said external clock and an external data signal, said apparatus recovering said recovered clock signal from said external clock by simulating use of a phase lock loop circuit, comprising the steps of:

digitizing said external clock signal to store time domain data of said external clock in a memory;

detecting time domain data of edges of said stored external clock;

converting said detected time domain data of said edges of said external clock into frequency domain data;

filtering said frequency domain data by multiplying said frequency domain data by respective predetermined coefficients in different frequency domains;

restoring said resultant frequency domain data to time domain data to obtain time domain data of the edges of said recovered clock signal;

comparing said time domain data of the edges of said recovered clock signal with said time domain data of said stored external clock signal; and measuring jitter of said external clock signal relative to said recovered clock signal.

4. The method as recited in claim 3 wherein said coefficients are selected to simulate a filter corresponding to said phase lock loop circuit.

5. A method for measuring jitter of an external data signal relative to a recovered clock signal in an apparatus that receives an external clock and said external data signal, and recovers said recovered clock from said external clock by simulating a phase lock loop circuit, comprising the steps of:

digitizing said external clock and said external data signal and storing the resulting time domain data of said external clock and said external data signal in a memory;

detecting time domain data of edges of said stored external clock;

converting said detected time domain data of said edges of said external clock into frequency domain data;

filtering said frequency domain data by multiplying said frequency domain data by respective predetermined coefficients in different frequency domains;

restoring resultant frequency domain data to time domain data to obtain time domain data of edges of said recovered clock;

comparing said obtained time domain data of said edges of said recovered clock with said time domain data of said stored external data; and measuring jitter of said external data signal relative to said recovered clock signal.

6. The method as recited in claim 5 wherein said coefficients are selected to simulate a filter corresponding to said phase lock loop circuit.

* * * * *